United States Patent [19]
Satoh et al.

[11] Patent Number: 5,950,756
[45] Date of Patent: Sep. 14, 1999

[54] VIBRATION ISOLATOR OF VIBRATION ACTIVELY REDUCING APPARATUS

[75] Inventors: Shigeki Satoh, Kanagawa; Takeshi Kimura, Yokohama; Kazushige Aoki, Kanagawa; Takahisa Hirade, Kawasaki, all of Japan

[73] Assignee: Nissan Motor Co., Ltd., Kanagawa, Japan

[21] Appl. No.: 08/944,508

[22] Filed: Oct. 6, 1997

[30] Foreign Application Priority Data

Oct. 4, 1996 [JP] Japan .................................... 8-264854
Jan. 24, 1997 [JP] Japan .................................... 9-011629

[51] Int. Cl.$^6$ .................................................. B62D 21/00
[52] U.S. Cl. ........................................................ 180/312
[58] Field of Search ............................................ 180/312

[56] References Cited

U.S. PATENT DOCUMENTS

| | | | |
|---|---|---|---|
| 5,038,886 | 8/1991 | Shibayama | 180/312 |
| 5,145,024 | 9/1992 | Doi | 180/312 |
| 5,226,500 | 7/1993 | Doi et al. | 180/312 |
| 5,332,061 | 7/1994 | Majeed et al. | 180/312 |
| 5,439,204 | 8/1995 | Yamazoe et al. | 267/140.14 |

FOREIGN PATENT DOCUMENTS 07233852 9/1995 Japan .
08145114 6/1996 Japan .

*Primary Examiner*—Kenneth R. Rice
*Attorney, Agent, or Firm*—McDermott, Will & Emery

[57] ABSTRACT

Described is a vibration isolator of a vibration actively reducing apparatus which achieves a more accurate detection of a residual vibration by means of a load sensor after an interference of a controlled vibration developed from a controlled vibration source constituting the vibration isolator against a vibration developed and transmitted from a vibration source such as a vehicular engine. In the vibration isolator, all vibration forces developed and transmitted from the vibration source are once concentrated onto a predetermined rigidity member such as a yoke of an electromagnetic actuator constituting the controlled vibration source and the load sensor is installed between the predetermined rigidity member and a lid member of the vibration isolator coupled to a supporting base member attached onto, for example, a vehicle body.

20 Claims, 8 Drawing Sheets

5,950,756

VIBRATION ISOLATOR OF VIBRATION ACTIVELY REDUCING APPARATUS

The contents of Applications No. Heisei 8-264854, with a filing date of Oct. 4, 1996 in Japan, and No. Heisei 9-11629, with a filing data of Jan. 24, 1997 in Japan, are herein incorporated by reference.

BACKGROUND OF THE INVENTION a) Field of the Invention

The present invention relates to a vibration isolator of a vibration actively reducing apparatus which interferes a vibration transmitted from a vibration source such as an engine to a supporter such as a vehicle body against a controlled vibration developed from a control vibration source intervened between the vibration source and the supporter so as to reduce the transmitted vibration. The present invention particularly relates the vibration isolator which more accurately detects a residual vibration after the interference between the vibration developed from the vibration source and the controlled vibration developed from the controlled vibration source and which drives the controlled vibration source on the basis of at least the residual vibration. The vibration isolator can accurately detect the above-described residual vibration.

b) Description of the Related Art

A Japanese Patent Application First Publication No. Heisei 7-233852 published on Sep. 5, 1995 exemplifies a previously proposed vibration isolator which detects the residual vibration.

That is to say, the above-described Japanese Patent Application First Publication discloses, so-called, an active engine mount which is interposed between the engine (vibration source) and the vehicle body so as to be enabled to generate an active supporting force.

In the above-described active engine mount, a supporting spring constituted by an elastic material made of a rubber is intervened between a casing fixed onto the engine and a center boss fixed onto a vehicle body. A fluid chamber is formed in the supporting spring in which a fluid is filled. A vibration plate which is capable of being vibrated in a direction such that a volume of the fluid chamber is varied is elastically supported by means of a plate spring. An electromagnetic actuator is fixed within a casing. Another elastic material made of the rubber is attached onto a surface of the center boss faced toward the vehicle body side. A plate-like member having a center through which a hole is provided is interposed between the other elastic material made of the rubber and the vehicle body (body frame) and a load (weight) sensor is housed in the center of the plate-like member through which the hole is provided. In details, since the load sensor is inserted between the elastic material made of the rubber and the vehicle body, a vibration force to be transmitted from the center boss to the vehicle body can be detected as a variation in the weight. Then, if the electromagnetic actuator is driven so as to reduce the output of the load sensor, i.e., the residual vibration, the vibration transmitted through the disclosed active engine mount can be reduced.

However, since, in the above-described active engine mount, the load sensor is mounted on the center boss via the elastic material made of the rubber, the output of the load sensor does not accurately correspond to the force transmitted toward the vehicle body via the engine mount due to an aging effect of the elastic material and an insufficient rigidity thereof.

In this case, it is difficult to achieve a highly accurate control of reduction in the vibration.

In addition, since, in the active engine mount disclosed in the above-described Japanese Patent Application First Publication, the load sensor is grasped between the elastic material and the vehicle body with the load sensor housed in the center of the plate-like member, a rate of the force to be transmitted to the vehicle body via the plate-like member is so high that it is difficult to detect an accurate detection of the residual vibration.

On the other hand, a Japanese Patent Application First Publication No. Heisei 8-145114 published on Jun. 4, 1996 exemplifies another active-type engine mount. Together with all forces transmitted toward the vehicle body through the disclosed active engine mount are once concentrated onto a yoke of the electromagnetic actuator and the load sensor is inserted between a flat plate portion integrated to a stud bolt fixed onto one end surface of the yoke and the end surface of the yoke and end surface of the yoke, the other end surface of the stud bolt being coupled to the vehicle body.

In this case, since the rate of the force transmitted through the load sensor becomes high, it becomes possible to detect the accurate residual vibration. Hence, in this structure, since the load sensor itself serves as a member determining a strength of the engine mount, the engine mount in its nature is disadvantageous in securing the strength of the engine mount. In other words, since the load sensor is disposed so as to enclose the stud boss, the load sensor exhibits the strength with respect to the vibration vertically transmitted through the engine mount. However, the load sensor cannot accept a part of the force with respect to the vibration in the lateral direction with respect to the engine mount.

Hence, since a burden is concentrated only to the stud bolt for the lateral vibration of the engine mount, it is necessary to sufficiently enlarge a diameter of the stud bolt so as to strengthen its strength of the stud bolt. However, there is a limit placed on the increase in the diameter of the stud bolt.

In addition, the stud bolt is utilized to grasp the load sensor. Hence, if the stud bolt is loosened, a pre-load applied to the load sensor is varied and a detection accuracy may be reduced.

SUMMARY OF THE INVENTION

It is therefore an object of the present invention to provide a vibration isolator of a vibration actively reducing apparatus which improves a disposed structure of a load sensor for detecting a residual vibration after an interference of a controlled vibration against a vibration developed and transmitted from a vibration source so as to enable a more accurate detection of the residual vibration, thereby achieving a highly accurate vibration reduction control.

The above-described object can be achieved by providing an apparatus for actively reducing a vibration comprising: a) a vibration source; b) a supporting base member on which the vibration source is supported, c) a vibration isolator including a controlled vibration source and interposed between the vibration source and the supporting base member, the controlled vibration source being adapted for developing a controlled vibration to be interfered against a vibration developed from the vibration source at an interference position of the vibration isolator, the vibration isolator further including: a predetermined rigidity member disposed on another position of the vibration isolator toward the supporting base member with respect to the interference position, the predetermined rigidity member being so arranged in the vibration isolator that all vibration forces transmitted from the vibration source toward the supporting base member are once concentrated thereonto; a lid member, fixed onto the supporting base member and having a peripheral edge portion thereof coupled to a surface of the predetermined rigidity member which faces toward the supporting base member so as to provide a gap between a more inner portion of the lid member than the peripheral edge portion thereof and the surface of the predetermined rigidity member; and a load sensor for detecting a residual vibration after the interference of the controlled vibration against the vibration developed from the vibration source and outputting the detected residual vibration in the form of a residual vibration signal, the load sensor having a pressure receiving surface thereof and which is so inserted between the predetermined rigidity member and the lid member so as to be located at an approximately center position of the gap and so as to receive the residual vibration from the predetermined rigidity member at its pressure receiving surface; and d) a controller for developing and outputting a drive signal to drive the controlled vibration source to develop the controlled vibration on the basis of the residual vibration signal from the load sensor.

The above-described object can also be achieved by providing an apparatus for actively reducing a vibration applicable to an automotive vehicle, comprising: a) a vehicular engine; b) a supporting base member on which the vehicular engine is supported, the supporting base member being attached onto a vehicle body; c) an engine mount including a controlled vibration source and which is interposed between the vehicular engine and the supporting base member, the controlled vibration source being adapted for developing a controlled vibration to be interfered against a vibration developed from the vehicular engine at an interference position of the engine mount, the engine mount further including: a predetermined rigidity member disposed on another position of the engine mount toward the supporting base member with respect to the interference position, the predetermined rigidity member being so arranged in the engine mount that all vibration forces transmitted from the vehicular engine toward the supporting base member are once concentrated thereonto; a lid member, fixed onto the supporting base member and having a peripheral edge portion thereof coupled to a surface of the predetermined rigidity member which faces toward the supporting base member so as to provide a gap between a more inner portion of the lid member than the peripheral edge portion thereof and the surface of the predetermined rigidity member; and a load sensor for detecting a residual vibration after the interference of the controlled vibration against the vibration developed from the vehicular engine and outputting the detected residual vibration in the form of a residual vibration signal, the load sensor having a pressure receiving surface thereof and which is so inserted between the predetermined rigidity member and the lid member so as to be located at an approximately center position of the gap and so as to receive the residual vibration from the predetermined rigidity member at its pressure receiving surface; and d) a controller for developing and outputting a drive signal to drive the controlled vibration source to develop the controlled vibration on the basis of the residual vibration signal from the load sensor.

The above-described object can also be achieved by providing an apparatus for actively reducing a vibration comprising: a) vibration developing means; b) a supporting base member on which the vibration developing means is supported; c) vibration isolating means including a controlled vibration developing means and interposed between the vibration developing means and the supporting base member, the controlled vibration developing means for developing a controlled vibration to be interfered against a vibration developed from the vibration developing means at an interference position of the vibration isolating means, the vibration isolating means further including: a predetermined rigidity member disposed on another position of the vibration isolating means toward the supporting base member with respect to the interference position, the predetermined rigidity member being so arranged in the vibration isolating means that all vibration forces transmitted from the vibration developing means toward the supporting base member are once concentrated thereonto; a lid member, fixed onto the supporting base member and having a peripheral edge portion thereof coupled to a surface of the predetermined rigidity member which faces toward the supporting base member so as to provide a gap between a more inner portion of the lid member than the peripheral edge portion thereof and the surface of the predetermined rigidity member; and residual vibration detecting means for detecting a residual vibration after the interference of the controlled vibration against the vibration developed from the vibration developing means and outputting the detected residual vibration in the form of a residual vibration signal, the residual vibration detecting means comprising a load sensor having a pressure receiving surface thereof and which is so inserted between the predetermined rigidity member and the lid member so as to be located at an approximately center position of the gap and so as to receive the residual vibration from the predetermined rigidity member at its pressure receiving surface; and d) controlling means for developing and outputting a drive signal to drive the controlled vibration developing means to develop the controlled vibration on the basis of the residual vibration signal from the load sensor.

BEST MODE FOR CARRYING OUT THE INVENTION

Reference will hereinafter be made to the drawings in order to facilitate a better understanding of the present invention.

(First Embodiment)

Figure 1A:
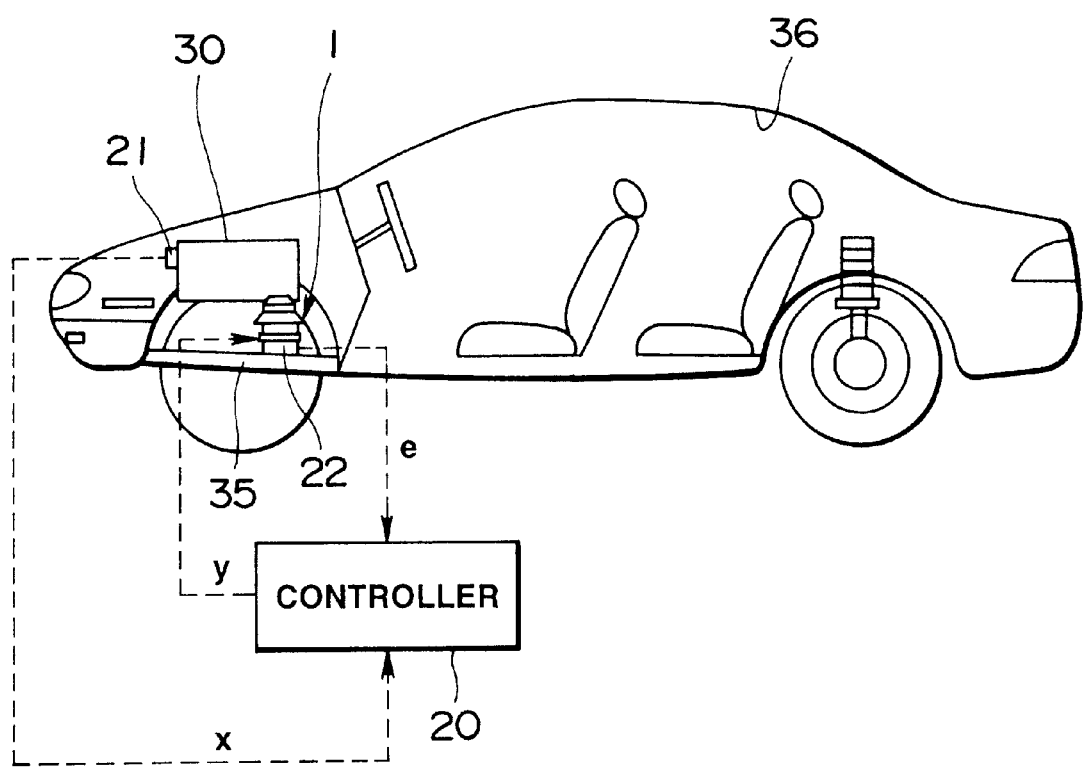
FIG. 1A is a schematic view of a whole system configuration of a vibration actively reducing apparatus having a vibration isolator in a first preferred embodiment according to the present invention which is applicable to an active engine mount of an automotive vehicle.
Figure 1B:
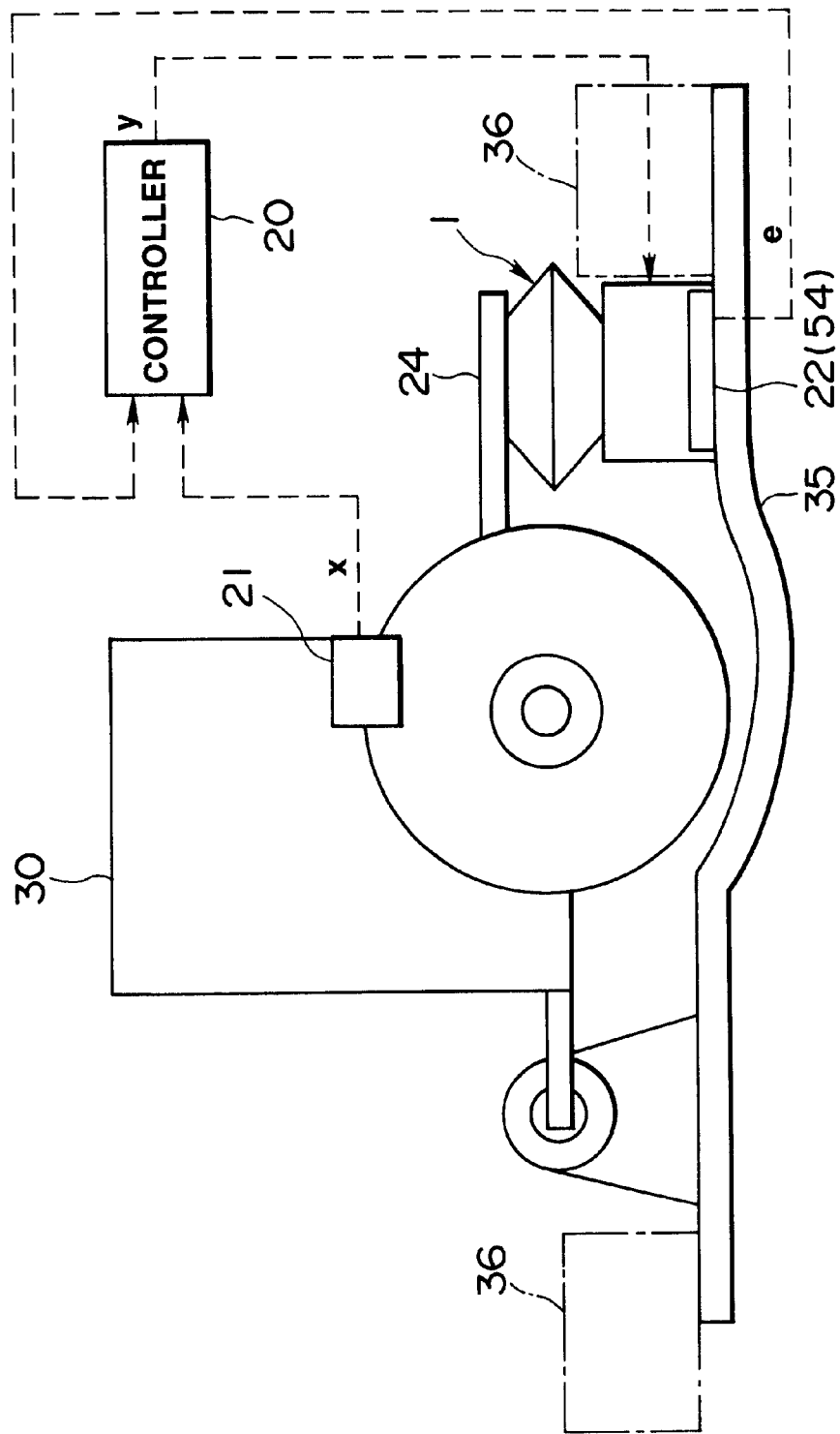
FIG. 1B is a partially schematic view of the vibration isolator in the first preferred embodiment shown in FIG. 1A.
Figure 2:
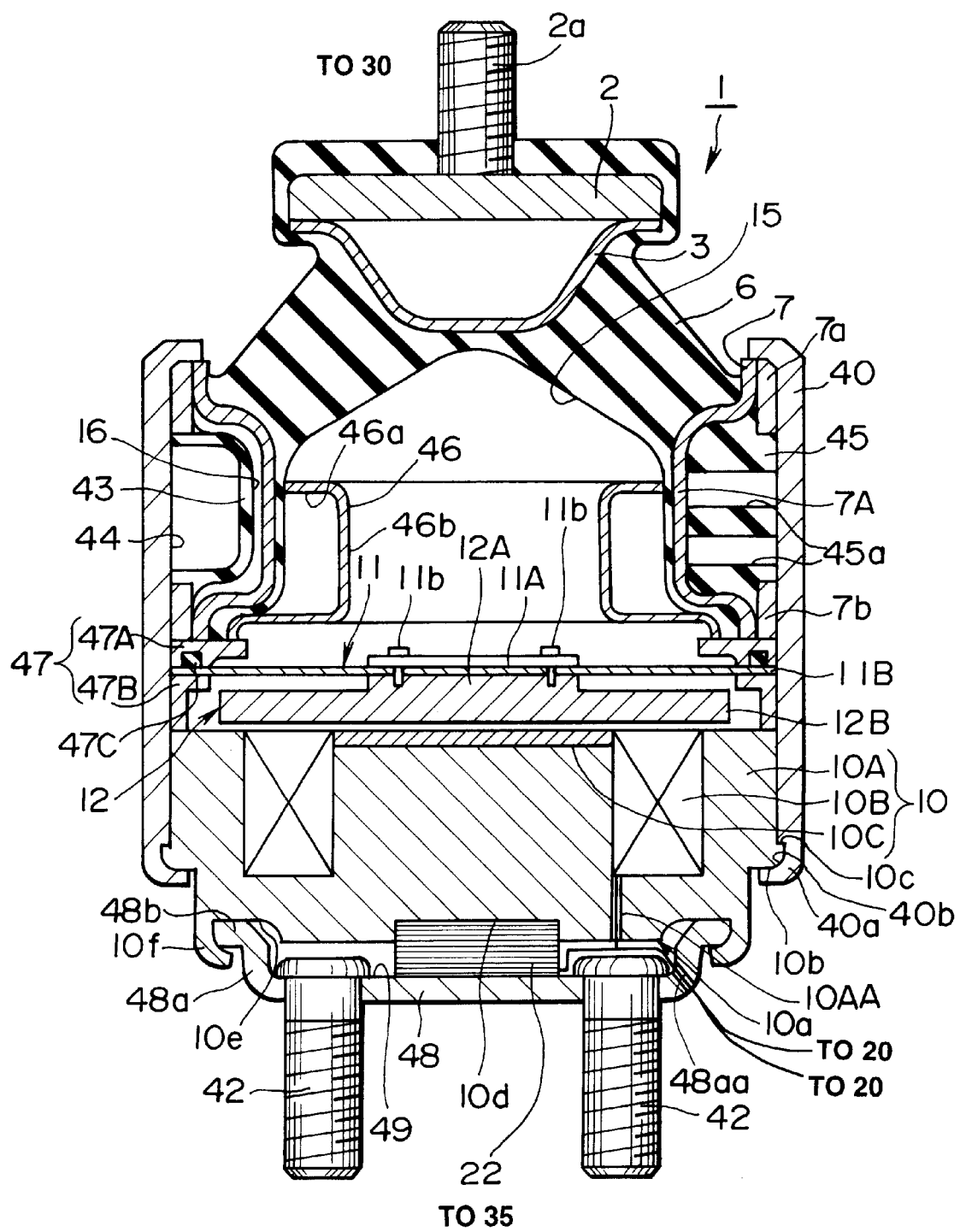
FIG. 2 is a cross sectional view of the vibration isolator in a second preferred embodiment shown in FIGS. 1A and 1B.

FIGS. 1A, 1B, and 2 show a first preferred embodiment of an apparatus for actively reducing a vibration having a vibration isolator according to the present invention which is applicable to, so-called, an active engine mount which actively reduces the vibration transmitted from an automotive vehicular engine tooward a vehicle body.

It is noted that FIG. 1A shows the automotive vehicle in which the engine mount 1 shown in FIG. 2 is mounted, FIG. 1B shows a whole arrangement of the engine mount 1, and FIG. 2 shows a cross sectional view of the engine mount 1.

As shown in FIG. 2, the engine mount 1 (vibration isolator) includes: a first plate-like attachment member 2 having a bolt 2a integrally mounted on an upper part of the attachment member 2 for mounting the whole engine mount 1 on the engine 30 as a vibrator (a vibration source); and an approximately truncated cone shaped inner envelope 3 having an upper end thereof fixed onto a lower surface of the first attachment member 2 by means of a welding.

An axis of the inner envelope 3 is faced vertically (as viewed from FIG. 2, the vertical direction means an up-and-down direction with respect to a vehicle body) and the lower end thereof has a diameter smaller than that of the opening upper end thereof.

A supporting elastic member 6 has a wall thickness, is formed in an approximately cylindrical shape, and has an inner peripheral surface slightly increased in the upper direction. The inner peripheral surface of the supporting elastic member 6 is vulcanized (adhered by means of a vulcanization) onto the upper surface of the first attachment member 2 and the outer peripheral surface of the inner envelope 3. The outer peripheral surface of the supporting elastic member 6 is vulcanized onto an upper part of the inner peripheral surface of an outer envelope 7.

The whole part of the outer envelope 7 is housed together with washer-type rings 7a, 7b on an upper edge of an approximately cylindrical casing 40. An axis of the cylindrical casing 40 is faced vertically.

An electromagnetic actuator 10 is housed within an inner part of a lower end of the cylindrical casing 40. The electromagnetic actuator 10 is housed within an inner part of a lower end of the cylindrical casing 40. The electromagnetic actuator 10 includes: an approximately hollow circular ring shaped yoke 10A made of iron; an excitation coil 10B wound around a bobbin (not shown)in the yoke 10A so that its axis of the coil 10B is faced vertically; and a permanent magnet 10C having pole (South and North) surfaces faced vertically with a part of an upper surface of the yoke 10A which is surrounded (enclosed) by the excitation coil 10B. The yoke 10A is inserted so that an end of a bottom surface 10a of the yoke 10A is projected outside of the cylindrical casing 40. A lower edge 40a of the casing 40 is fixed onto an outer peripheral side surface of the yoke 10A.

Specifically, the outer peripheral surface of the yoke 10A is formed with the bottom surface 10a, a relatively large-diameter step difference portion 10b whose diameter becomes smaller as it becomes near to the bottom surface 10a, and a relatively small-diameter step difference portion 10c located at an upper position with respect to the relatively large diameter step difference portion 10b and whose upper part becomes small in diameter. Thus, the lower edge 40a of the casing is caulked from an external side to an inner side so as to surround the relatively large-diameter step difference portion 40b is formed on an inner peripheral surface of the cylindrical casing 40 so that the relatively small diameter step difference portion is intruded thereinto.

Hence, when the lower edge 40a of the casing 40 is caulked as described above, a large-diameter portion between the step difference portions 10b and 10c is intruded into the inner peripheral surface of the casing 40 so that the lower edge 40a of the casing 40 is fixed onto the outer peripheral surface of the yoke 10A by means of the caulking.

In addition, a small-diameter portion 7A is formed at a center portion of the outer envelope 7 along its axial direction. The small-diameter portion 7A is recessed inwardly in a radial direction of the outer envelope 7. A thin-film elastic body 43 forming a cavity 44 is disposed at an arbitrary position along an outer peripheral direction of the small-diameter portion 7A and fixed on an inner side of the casing 40. The cavity 44 is exposed to the atmospheric pressure via a penetrating hole (not shown) formed on a side surface of the casing 40.

An elastic body 45 made of rubber is housed at another part outside the small-diameter portion 7A. The elastic body 45 serves to form an orifice 45a. One end of the orifice 45a within the elastic body 45 is communicated with a sub fluid chamber 16 formed with a surface opposite to the cavity 44 of the thin-film elastic body 43 and an outside surface of the outer envelope 7.

On the other hand, an orifice constituting body 46 in a form of a ring having a letter C shape in cross section is fixed on an inside of the small-diameter portion 7A so as to extend toward the inside of the fluid member 15. The orifice 46a is formed between an inner side of the orifice constituting body 46 and the inner surface of the outer envelope 7.

The orifice 46a is communicated with the fluid chamber 15 via a penetrating hole (not shown) formed at an arbitrary position in a peripheral direction of the orifice constituting body 45 made of the rubber via a penetrating hole (not shown) formed on the outer envelope 7 deviated by for example 180° in the peripheral direction from the penetrating hole of the orifice constituting body 46. Fluid such as an oil is sealed in the fluid chamber 15, a sub fluid chamber 16, and the orifices 45a and 46a.

A gap adjusting ring 47 is interposed between a lower end surface of the outer envelope 7 and the upper surface of the yoke 10A. The gap adjusting ring 47 is divided into an upper ring 47A and a lower ring 47B. A peripheral edge 11B of a plate spring 11 made of a circular metal is inserted between the upper ring 47A and the lower ring 47B. It is noted that a seal ring 47C is buried into a surface of the upper ring 47B faced toward the plate spring 11. Furthermore, a magnetic path member 12 is fixed which is made of a magnetizable material (for example, a ferromagnetic material such as iron) on a lower surface of a center portion 11A of the plate spring 11 by means of a screw 11b inserted through the upper surface of the plate spring 11.

The magnetic path member 12 is a disc-shaped member having its center portion 12A being slightly thicker than another part thereof. A projected side of the thick center portion 12A of the magnetic path member 12 is faced against the plate spring 11 and fixed onto the plate spring 11 by means of the screw 11b as described above. An outer envelope size of the magnetic path member 12 is slightly larger than the outer diameter of the excitation coil 10B of the electromagnetic actuator 10. Its peripheral edge portion 12B of the magnetic path member 12 is formed against the surface of the yoke 10A outside the excitation coil 10B.

The bottom surface 10a of the yoke 10A which is projected outside of the casing 40 has a circular recess 10d at its center portion of the bottom surface 10a and an annular recess 10e continued in the ring shape at its peripheral edge portion of the bottom surface 10a. A lower-side projection portion 10f in a cylindrical shape is formed on an outer side of the annular recess 10e. A lid member 48 made of iron is fixed onto the projection portion 10f. The lid member 48 is an iron-made disc-shaped member on a peripheral edge of which an upper-side projected portion 48a is formed. A flat portion inside the peripheral edge of the lid member 48 has mounting bolts 42 penetrated downward and used to fix the engine mount 1 onto a supporting base member 35 as a base which is elastically supported on a vehicle body 36 as shown in FIGS. 1A and 1B. The lid member 48 further includes a flange portion 48b which is a curved portion of an end of the upper-side projected portion 48a toward an outside in the radial direction of the lid member 48. With the flange portion 48b contacted on the bottom surface of the annular recess 10e, the upper-side projected portion 10f of the bottom surface 10a is caulked toward the inner direction of the lid member 48 so that the flange portion 48b is received within the annular recess 10e. In this way, since the upper-side projected portion 10f is bent from the outer side to the inner side of the lid member 48, front and rear surfaces of the flange portion 48b and the whole area of the outer peripheral surface can be coupled together within the annular recess 10e and the lid member 48 can rigidly be fixed on the bottom surface 10a of the yoke 10A. A clearance (gap) 49 having a size determined according to a depth of the annular recess 10e and according to a height of the upper-side projected portion 48a of the lid member 48 is formed between the bottom surface 10a of the yoke 10A and the lid member 48. A (an approximately disc-shaped) load sensor 22 is disposed between the bottom surface 10a of the yoke 10A and the lid member 48 so as to be positioned at the center of the clearance (gap) 49. The load sensor 22 is housed within the sensor housing recess 10d located at the approximately center of the bottom surface 10a. It is noted that a result of detection through the load sensor 22 is supplied to a controller 20 as a residual vibration signal e.

In other words, all (vibration) forces derived from the engine 30 into the engine mount 1 are once concentrated onto the yoke 10A (as a predetermined rigidity member) via the supporting elastic body 6, the outer envelope 7, the casing 40, and the clearance adjusting ring 47. A part of the concentrated forces is transmitted to the lid member 48 via the load sensor 22. The other part of the forces are transmitted from the yoke 10A to the lid member 48 via the upper-side projected portion 48a.

Since the forces inputted to the lid member 48 are transmitted to the supporting base member 35 as the base, the detected value of the load sensor 22 represents the vibration transmitted via the engine mount 1 toward the supporting base member 35.

A characteristic of the engine mount 1 as a fluid mount which determines a fluid path formation of the orifices 45a and 46a and which determines a spring constant of a supporting elastic body 6 is adjusted to exhibit a high dynamic spring constant and a high damping force in a case where an engine shake during the run of the vehicle, i.e., when the engine mount 1 is vibrated in a frequency range from 5 Hz to 15 Hz.

The excitation coil 10B of the electromagnetic actuator 10 generates a predetermined electromagnetic force according to a drive signal y supplied from the controller 20 via a harness. The controller 20 includes a microcomputer having a microprocessor, I/O interface, A/D converter, D/A converter, amplifiers, and so forth.

In a case where each of engine idling vibration, enclosed sound vibration, and an acceleration vibration whose frequency is higher than that of the engine shake is inputted toward the supporting base member 35, the controller 20 develops the drive signal y and outputs it to the engine mount 1 so that an active supporting force which can reduce each of the vibrations is developed on the engine mount 1.

Since the idling vibration or enclosed sound vibration is developed due to a main cause such that, in a case of a reciprocating four-cylinder engine, the vibration of the engine in a second order of engine revolutions is transmitted to the member 35, the reduction in the vibration at the vehicle body is possible if the drive signal y is developed and outputted in synchronization with the second order of the engine revolutions. In the first embodiment, an impulse signal synchronized with the revolutions of a crankshaft of the engine 30 (for example, one impulse for each 180° revolution of the engine crankshaft in the case of the four-cylinder engine) is developed and outputted as a reference signal x by means of a pulse signal generator 21.

The reference signal x is supplied to the controller 20 as a signal representing a generation state of the vibrations in the engine 30 as the vibration source.

The controller 20 receives the residual vibration signal e from the load sensor 22 as described above.

The controller 20 executes a synchronous type Filtered-X LMS (Least Mean Square) algorithm which is one of adaptive algorithms on the basis of the supplied residual vibration signal e and the reference signal x to calculate the drive signal y to the engine mount 1, the drive signal y being outputted to the electromagnetic actuator of the engine mount 1.

Specifically, the controller 20 includes an adaptive digital filter W having variable filter coefficients Wi (i=0, 1, 2, . . . , I−1; I denotes a number of taps in the filter W).

At a time at which the latest reference signal x is inputted and whenever a predetermined sampling time is passed, the filter coefficient Wi of the adaptive digital filter is outputted sequentially as the drive signal y. On the other hand, the filter coefficient Wi of the adaptive digital filter is properly updated on the basis of the reference signal x and the residual vibration signal e.

The updating equation of the adaptive digital filter W is expressed in the following equation (1) in accordance with the Filtered-X LMS algorithm:

$$Wi(n+1)=Wi(n)-\mu R^T e(n) \quad (1)$$

In the equation (1), terms attached with (n) and (n+1) indicate values at the sampling times of n and n+1 and $\mu$ denotes a convergence coefficient.

In addition, the updating reference signal $R^T$ is a filter processed value of the reference signal x by means of a transfer function $C^\wedge$ of a transfer function C defined between the electromagnetic actuator 10 of the engine mount 1 and an acceleration (load) sensor 22 modeled in a limited impulse response type filter.

Since the magnitude of the reference signal x is "1", the updating reference signal $R^T$ is coincident with a sum of the impulse response waveforms at the sampling time a n when the impulse response is sequentially developed in synchronization with the reference signal x.

In addition, theoretically, the drive signal y is generated by filtering the reference signal x through the adaptive digital filter W. Since the magnitude of the reference signal x is "1", the same result is obtained as the result of filtering being the drive signal y even when the filter coefficient Wi is sequentially outputted as the drive signal.

These calculations in the controller 20 are actually executed in the microprocessor. Then, the controller 20 functionally includes: a drive signal output block for sequentially outputting the filter coefficients Wi of the adaptive digital filter W as the drive signal y from a time at which the reference signal x is inputted; an updating reference signal calculation block for convoluting the reference signal x and the transfer function filter $C^\wedge$ to calculate the updating reference signal $R^T$; and a filter coefficient updating block for updating each filter coefficient Wi of the adaptive digital filter W in accordance with the equation (1) described above on the basis of the updating reference signal $R^T$ and the residual vibration signal e.

Next, an operation of the vibration actively reducing apparatus having the vibration isolator in the first embodiment shown in FIG. 2 will be described below.

When the engine shake occurs, the engine mount 1 functions as the supporting device having the high dynamic spring constant and the high damping force since the spring constant of the supporting elastic body 6 and the fluid path formation of the orifices 45a and 46a are properly selected. Hence, the engine shake generated by the engine 30 is attenuated by means of the engine mount 1 so that a vibration level on the supporting base member 35 is reduced. It is noted that it is not especially necessary to displace positively the magnetic path member 12.

On the other hand, in a case where the vibration having the frequency equal to or higher than the idling vibration frequency and such that the fluid within the orifices 45a and 46a becomes sticky so that the movement of fluid between the fluid chamber 15 and sub fluid chamber 16 becomes impossible, the controller 20 executes a predetermined arithmetic operation to output the drive signal y to the electromagnetic actuator 10 (excitation coil 10B), thus the active supporting force which can reduce the vibration on the engine mount 1 being developed.

In details, each filter coefficient Wi of the adaptive digital filter W is sequentially outputted as the drive signal y to the electromagnetic actuator 10 of the engine mount 1 at the time at which the reference signal x is inputted and at the interval of time of the sampling clock.

As a result, a magnetic force according to the drive signal y is developed on the excitation coil 10B. However, a constant magnetic force by means of the permanent magnet 10C is already given to the magnetic path member 12. Hence, the magnetic force by means of the excitation coil 10B is acted upon the permanent magnet 10C so that the magnetic force of the permanent magnet 10C is strengthened or weakened. In details, with no drive signal y supplied to the excitation coil 10B, the magnetic path member 12 can be displaced at a neutral position such that the supporting force by means of the plate spring 11 and the magnetic force by means of the permanent magnet 10C are balanced.

In the neutral position at which the magnetic path member 12 is displaced, the drive signal y is supplied to the excitation coil 10B. At this time, if the magnetic force developed on the excitation coil 10B according to the drive signal y is opposite to the magnetic force of the permanent magnet 10C, the magnetic path member 12 is displaced toward a direction such that the clearance between the magnetic path member 12 and the electromagnetic actuator 10 is increased.

On the contrary, if the direction of the magnetic force developed on the excitation coil 10B is the same as that of the permanent magnet 10C, the magnetic path member 12 is displaced toward an opposite direction such that the clearance between the magnetic path member 12 and the electromagnetic actuator 10 is decreased.

Since the magnetic path member 12 can be displaced in both normal and reverse directions, the magnetic path member 12 is displaced so that a volume of the main fluid chamber 15 is varied. According to the change in volume of the main chamber 15, an expansion spring of the supporting elastic body 6 is deformed according to the variation of the volume of the fluid chamber 15. Hence, the active supporting force in both normal and reverse directions is developed on the engine mount 1.

Each filter coefficient Wi of the adaptive digital filter W which serves as the drive signal y is sequentially updated in accordance with the above equation (1) of the synchronous type Filtered-X LMS algorithm. Hence, after some time has passed and each filter coefficient Wi of the adaptive digital filter W is converged into an optimum value, the drive signal y is supplied to the engine mount 1 so that the idling vibration and enclosed sound vibration transmitted from the engine 30 toward the supporting base member 35 via the engine mount 1 can be reduced.

In the first embodiment, the load sensor 22 is directly inserted between the iron-made yoke 10A and the lid member 48 without an intervention such as the rubber-made elastic body (material). The electromagnetic actuator 10 interposed between the supporting elastic body 6 and the member 35 is the member disposed toward a position near to the supporting base member 35 rather than on an interference position at which the vibration and the controlled vibration are interfered against each other. All forces transmitted from the engine 30 toward the supporting base member 35 via the engine mount 1 are concentrated onto the yoke 10A of the electromagnetic actuator 10. In addition, an aerial space is formed surrounding the load sensor 22 so that the part of the vibrations concentrated on the yoke 10A is always transmitted toward the lid member 48 via the load sensor 22. Hence, the load sensor 22 permits the more accurate detection of the residual vibration.

It is important that, as is different from the reference signal x which places an importance on a generation timing of each pulse of the reference signal x, an amplitude of the residual vibration signal e which is the output of the load sensor 22 accurately represents the magnitude of the actual vibration as appreciated from the above equation (1). Since the load sensor 22 in the first embodiment can accurately detect the residual vibration, the highly accurate control over the reduction in the vibration by means of the vibration actively reducing apparatus can be achieved.

In addition, since the upper-side projected portion 48a of the lid member 48 is coupled to the bottom surface 10a of the yoke 10A by means of the caulking, the lid member 48 is integrated to the yoke 10A in the vertical direction and in the horizontal direction. Therefore, during, for example, the engine shake, the strength of the engine mount 1 with respect to a lateral vibration inputted to the engine mount 1 can sufficiently be secured. In addition, the upper-side projected portion 48a helps the formation of the clearance 49.

Then, since the height of the upper-side projected portion 48a and the depth of the annular recess 10e are properly selected, a suitable pre-load can be given to the load sensor 22. If the suitable pre-load is given to the load sensor 22, the residual vibration signal e can be assured to be varied in both normal and reverse directions according to the increase and decrease in the load inputted to the engine mount 1. In addition, if the upper-projected portion 48a is coupled to the bottom surface 10a by means of the caulking, a possibility of increase in the size of the aerial space (gap) 49 during the practical use of the engine mount 1 so as to vary the magnitude of the pre-load can remarkably be reduced since no loosening occurs such as a case where the screw would be used.

Thus, a favorable vibration reduction control can be achieved.

In the first embodiment, the lower end 40a of the casing 40 is fixed onto the outside surface of the yoke 10A by means of the caulking, the lid member 48 is fixed onto the bottom surface 10a of the yoke 10A projected outside of the casing 40, the lower surface of the lid member 48 is fixed onto the supporting base member 35 through the bolts 42 with its lower surface of the lid member 48 being contacted against the member 35.

Hence, since the casing 40 can be assured to be non-contact state against the lid member 48 and the supporting base member 35, all of the forces inputted to the supporting elastic body 6 can once be concentrated onto the yoke 10A. Hence, the favorable vibration reduction control can be achieved as described above.

In the first embodiment, the sub fluid chamber 16 is formed outside of the outer envelope 7. Hence, the height size of the engine mount 1 can be lowered as compared with the engine mount 1 such that the sub fluid chamber 16 and the orifice constituting body 46 are disposed above the fluid chamber 15.

In the first embodiment, the orifice constituting member 46 is projected toward the inner side in the radial direction at the approximately center portion along the vertical direction of the fluid chamber 15 so that the space in the fluid chamber 15 is vertically divided into two with the orifice constituting member 46 as a boundary. Suppose that a space of an inner diameter portion of the orifice constituting member 46 is the orifice 46b. The two fluid chambers formed with the orifice constituting member 46 as the boundary are communicated with each other via the orifice 46b. Suppose a fluid resonant system in which the fluid within the orifice 46b is amass, the expansion spring of the supporting elastic body 6 and the plate spring 11 are as a spring. If a resonant frequency of the fluid resonant system is suitably tuned, the engine mount 1 which can exhibit a favorable anti-vibration effect on the further variety of vibration frequencies.

In the first embodiment, a movable member is constituted by the plate spring 11 and the magnetic path member 12, the engine mount 1 corresponds to the controlled vibration source, the load sensor 22 corresponds to a residual vibration detector (residual vibration detecting means), and the yoke 10A corresponds to the predetermined rigidity member.

(Second Embodiment)

Figure 3:
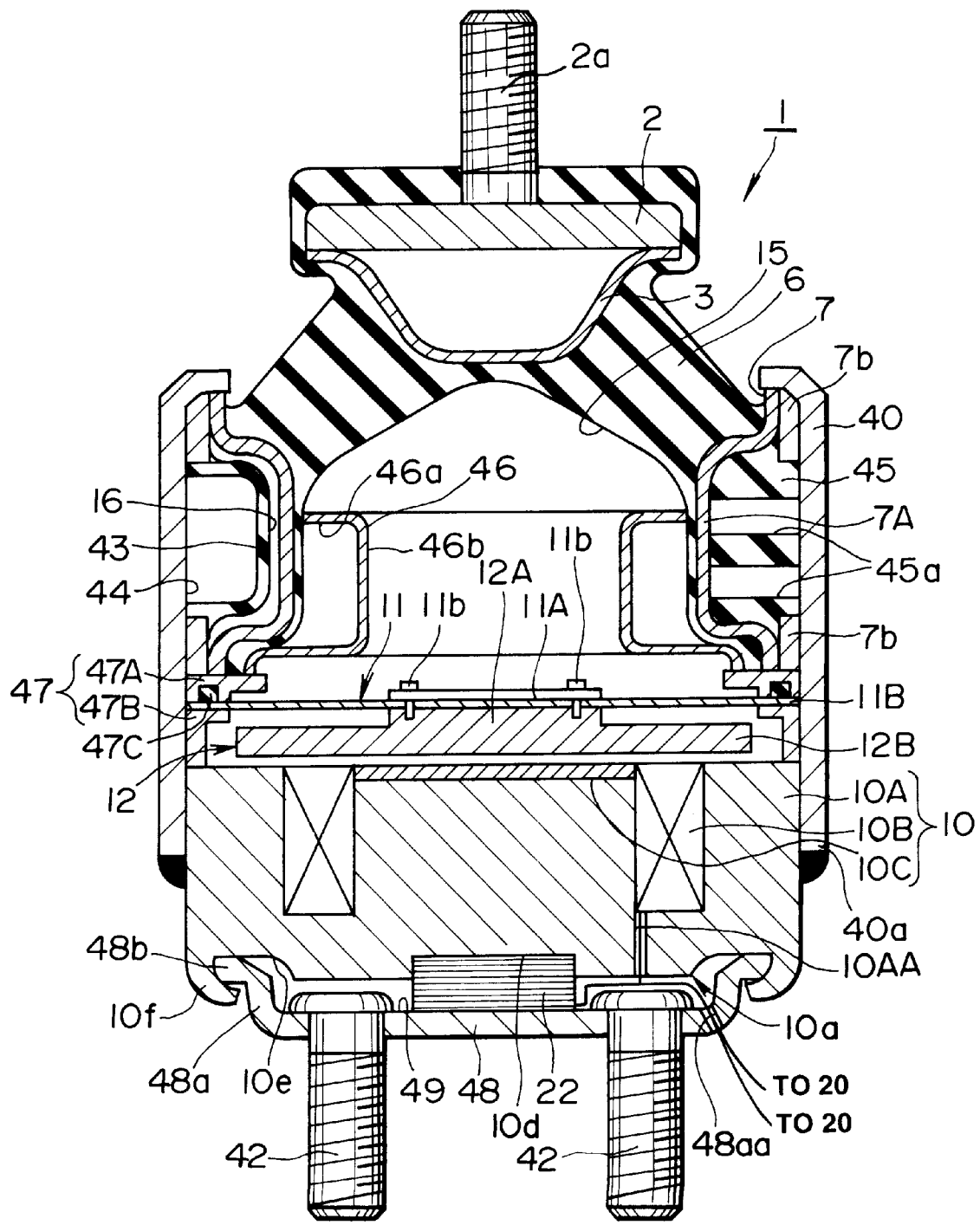
FIG. 3 is a cross sectional view of the vibration isolator in a third preferred embodiment according to the present invention

FIG. 3 shows a structure of a second preferred embodiment of the vibration isolator according to the present invention which is applicable to the active engine mount 1 of the vehicle.

The mounted state of the engine mount 1 is the same as the first embodiment shown in FIGS. 1A and 1B and the detailed explanations of the same reference numerals as described in the first embodiment are omitted herein.

That is to say, in the second embodiment, step difference portions 10b and 10c are not formed on the outer peripheral surface of the yoke 10A as the predetermined rigidity member and the small-diameter portion 40b is not formed on the inner peripheral surface of the casing 40.

Hence, the lower edge portion 40a of the casing 40 is not fixed onto the outer peripheral surface of the yoke 10A by means of the caulking but welded to the outer peripheral surface of the yoke 10A over the whole area in the peripheral direction of both surfaces 40a and yoke 10A as shown in FIG. 3.

In the same manner as described in the first embodiment, all of the vibrations inputted to the engine mount 1 from the engine 30 are once concentrated onto the yoke 10A and the other structures are the same as the first embodiment.

Consequently, the same operation and advantages as described in the first embodiment can be obtained in the case of the second embodiment.

Since the lower edge (end) portion 40a of the casing 40 is welded to the outer peripheral surface of the yoke 10A, the step difference portions on the outer peripheral surface of the yoke 10A are not needed so that the cost of the parts can accordingly be reduced.

(Third Embodiment)

Figure 4:
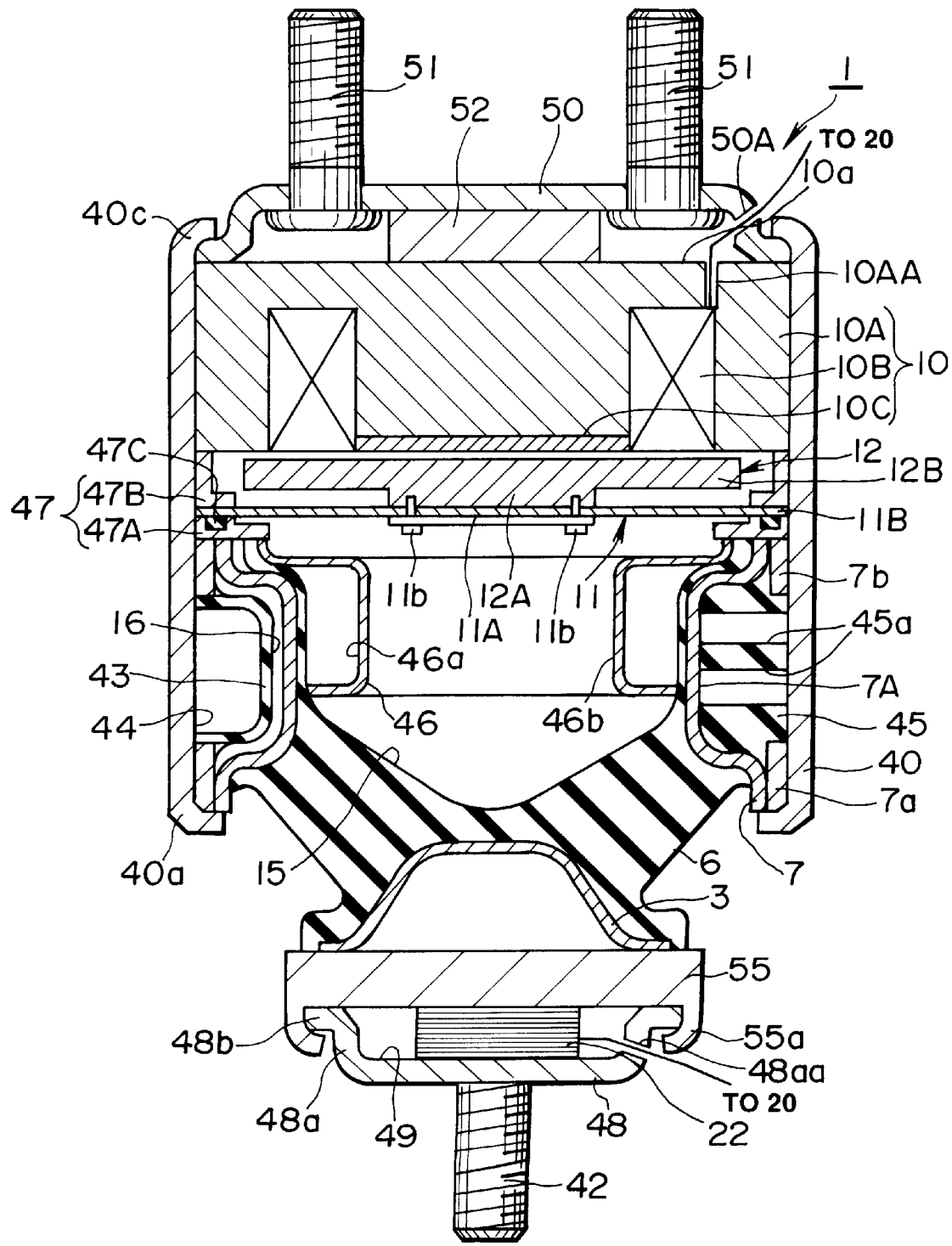
FIG. 4 is a cross sectional view of the vibration isolator in a third preferred embodiment according to the present invention.

FIG. 4 shows a structure of a third preferred embodiment of the vibration isolator according to the present invention which is applicable to the engine mount 1 of the vehicle.

The mounted state of the engine mount 1 shown in FIG. 4 is the same as described in the first embodiment and the detailed explanations of the same reference numerals as those in the first embodiment shown in FIGS. 1A, 1B, and 2 are omitted herein.

That is to say, although, the engine mount 1 in the third embodiment shown in FIG. 4 has, basically, the approximately same structure as that in the first embodiment described before, a main difference is that the engine mount 1 in the third embodiment takes an upside down structure as against the engine mount 1 in the first embodiment.

In details, although, in the first embodiment, the electromagnetic actuator 10 is disposed between the supporting member 6 and the member 35, in the third embodiment, the electromagnetic actuator 10 is disposed between the supporting elastic member 6 and the engine 30.

In more details, the upper end portion 40c of the casing 40 is caulked to the bottom surface 10a of the electromagnetic actuator 10 together with the peripheral edge portion of the disc-shaped attachment member 50. The mounting bolts 51 penetrating the attachment member 50. The mounting bolts 51 penetrating the attachment member 50 are tightened to the engine body 30. An intervening washer 52 is interposed between the attachment member 50 and the bottom surface 10a of the yoke 10A so as to secure the strength of the engine mount 1. In addition, the lower end portion 40a of the casing 40 is caulked to a part of the lower end of the outer envelope 7, thereby the electromagnetic actuator 10, the fluid chamber 15, and the sub fluid chamber 16 being housed within the inner space of the casing 40.

On the other hand, the inner peripheral part of the supporting elastic body 6 is vulcanized onto the outside surface of the inner envelope 3, i.e., welded (fixed) onto the upper surface of a second iron-made attachment member 55 in a thick flat plate shape as the predetermined rigidity member. The lid member 48 is fixed onto a lower surface of the second attachment member 55.

Specifically, a cylindrical lower-side projected portion 55a is formed on a peripheral edge portion of the lower surface of the attachment member 55.

With the flange portion 48b of the upper-side projected portion 48a of the lid member 48 contacted on the lower surface of the second attachment member 55, the lower-side projected portion 55a of the second attachment member 55 is caulked inwardly so that the lid member 48 is fixed onto the lower surface of the second attachment member 55. The mounting bolt 42 for mounting the engine mount 1 on the supporting base member 35 is fixed onto the approximately center part of the rear surface of the lid member 48. Then, the load sensor 22 is inserted between the lid member 48 and the second attachment member 55 so as to be located at the approximately center portion of the clearance (gap) 49 formed between the lid member 48 and the second attachment member 55.

In the third embodiment, all of the vibrations (forces) inputted from the engine 30 toward the engine mount 1 are inputted to the second attachment member 55 via the supporting elastic member 6, the load sensor 22 is disposed at the approximately center of the clearance formed between the second iron-made attachment member 55 and the lid member 48, and the lid member 48 is caulked onto a lower surface of the second attachment member 55. Hence, the disposed state of the load sensor 22 and its surrounding condition are exactly the same as in the case of the first embodiment. Consequently, the same operation and advantages as those in the first embodiment can be achieved.

It is noted that the diameter of the load sensor 22 is smaller than the inner diameter of the coil housing recess formed on the yoke 10A and the approximately bell shaped lid member 48 has the same meaning as the lid member 48 of an approximately letter-U shape in cross section.

In each of the first, second, and third embodiments, the cylindrical casing 40 is fixed to the yoke 10A by means of the caulking or by means of the welding. However, the casing 40 may be bolted to the yoke 10A.

In each of the first, second, and third embodiments, the vibration transmission prevention (anti-vibration) effect is achieved by utilizing the fluid resonance system achieved by means of the orifices 45a and 46a in addition to the actively vibration system utilizing the electromagnetic actuator, load sensor, and the controller described above. In the case where it is not necessary to utilize the vibration transmission effect by means of the fluid resonance system, the orifice constituting member 46 and so forth related to the fluid resonance system may be omitted.

(Fourth Embodiment)

Figure 5:
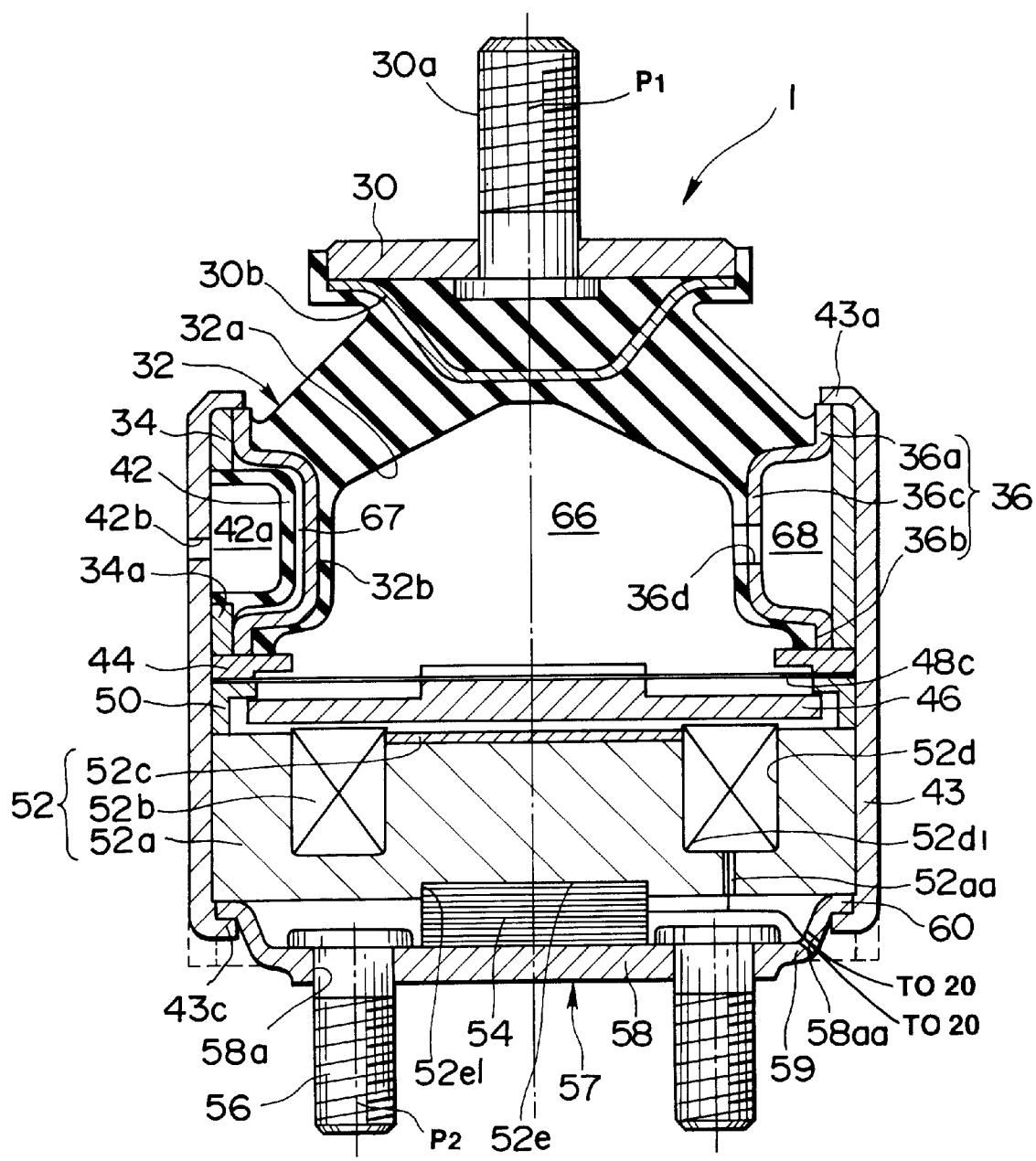
FIG. 5 is a cross sectional view of the vibration isolator in the fourth preferred embodiment according to the present invention.

FIG. 5 shows a structure of a fourth preferred embodiment of the vibration isolator according to the present invention which is applicable to the active engine mount 1 of the vehicle shown in FIG. 1A.

The engine mount 1 shown in FIG. 5 is disposed at the backward portion of the laterally mounted engine 30, its upper part of the engine mount 1 being attached onto the bracket 24 and its lower part thereof being attached onto the supporting base member 35 as the base of the vehicle body 36 as shown in FIGS. 1A and 1B.

The engine mount 1 in the fourth embodiment includes mounting parts such as the outer envelope 34, the orifice constituting member 34, and the supporting elastic body 32 defining the main fluid chamber, these mounting parts being incorporated into the inner space of the apparatus casing 43. The engine mount 1 in the fourth embodiment further includes the electromagnetic actuator 52 which serves as the actuator for displacing the movable member forming a part of the partitioned wall of the main fluid chamber and elastically supported thereby in the direction such that the volume of the main fluid chamber is varied; and the load sensor 54 which detects the vibration situation of the supporting member (base) 35. The electromagnetic actuator 52 and the load sensor 54 are located below the above-described mounting parts.

The load sensor 54 is constituted by, for example, a piezoelectric device.

In addition, the engine mount 1 includes an engine linkage member 30 having a linkage bolt 30a fixed onto the linkage member 30 so as to be faced toward the upper direction. A hollow envelope body 30b is fixed onto a lower part of the linkage member 30. The hollow envelope body 30b is of an inverted trapezoid shape in cross section.

The supporting elastic body 32 is vulcanized onto the lower surface of the linkage member 30 so as to enclose the lower part of the engine linkage member 30 and the hollow envelope body 30b.

The supporting elastic body 32 is the elastic member having a thickness in approximately cylindrical shape such that its center part becomes inclined moderately toward its outer peripheral part. A hollow portion 32a in an approximately mountain shape in cross section is formed in an inner space of the supporting elastic body 32. Then, a lower end 32b of the supporting elastic body 32 having the thin thickness is coupled to an inner peripheral surface of the orifice constituting member 36 by utilizing a vulcanization. The orifice constituting member 36 has an axial center P1 (hereinafter, called a mount axle) faced in the vibrating source supporting direction (in this case, in the vertical direction) coaxially with the hollow envelope body 30b.

The orifice constituting member 36 is the member continuously forming an upper end envelope portion 36a, a lower end envelope portion 36b, and an intermediate small-diameter envelope portion 36c. Each outer diameter of the upper end envelope portion 36a and the lower end envelope portion 36b is the same. An outer peripheral portion of the orifice constituting member 36 has an annular recess. A hole 36d is formed on the intermediate small-diameter envelope 36c. The lower end portion 32b of the supporting elastic body 32 is coupled to the inner peripheral surface of the orifice constituting member 36. However, the lower end portion 32b does not close the hole 36d but the inner side and outer side of the orifice constituting member 36 are communicated via the hole 36d.

The outer envelope 34 is tightly inserted between the casing 43 and an outer peripheral end of the orifice constituting member 34. An inner peripheral surface of the outer envelope 34 encloses the annular recess of the orifice constituting member 36 so that an annular space is defined in its peripheral direction of the orifice constituting member 34. A diaphragm 42 is disposed in the annular space.

Namely, an inner diameter of the outer envelope 34 has the same size as the outer diameter of each of the upper end envelope portion 36a and the lower end envelope portion 36b. The outer envelope 34 is the cylindrical member having a length in its axial direction which is set to have the same size as that of the orifice constituting member 36. A slit-shaped opening 34a exposed to the part of the annular recess except a position at which the hole 36d is formed is formed peripherally.

The diaphragm 42 is a thin-film elastic body made of the rubber. The diaphragm 42 is coupled to the whole periphery of an opening edge of the opening 34a so as to close the opening 34a and is disposed so as to extend out toward the annular recess of the orifice constituting member 36. The outer envelope 34 is tightly inserted on the upper part of the casing 43.

The casing 43 is formed with an upper end caulked portion 43a having a circular opening whose diameter is smaller than the outer peripheral diameter of the upper end envelope 36a. The casing 43 is the cylindrical member such that the shape of the casing main body continued with the upper end caulked portion 43a is continued up to the lower end opening (shape of the lower end opening is denoted by a dotted line of FIG. 5), its inner diameter remaining the same as the outer diameter of the outer envelope 34.

In addition, the outer envelope 34 integrated with the supporting elastic body 32, the orifice constituting member 36, and the diaphragm 42 is fitted internally from the lower end opening of the casing 43. The outer envelope 34 and the upper end portion of the orifice constituting member 36 are contacted against the lower surface of the upper end caulking portion 43a so as to be disposed on the upper part of the casing 43.

An aerial hole 42a is defined at a part enclosed with an inner peripheral surface of the casing 43 and with the diaphragm 42.

An aerial hole 42b is formed at a position at which the aerial chamber 42a is exposed thereto. The atmospheric pressure is communicated with the aerial chamber 42a via the air hole 42b.

Furthermore, the seal ring 44, the plate spring 48C integrated to the magnetic path member 46, the gap (clearance) retaining ring 50, the electromagnetic actuator 52, the load sensor 54, and the lid member 57 are sequentially incorporated into the lower part of the casing 43. Upon the completion of the assembly of these parts, the lower end portion of the casing 43 is caulked internally in the radial direction of the casing 43 so that the casing 43 is formed with a lower end caulked portion 43c as denoted by a solid line of FIG. 6.

It is noted that, in the fourth embodiment, the movable member is constituted by the magnetic path member 46 and the plate spring 48C.

The seal ring 44 is an annular member having an outer diameter which has the same size as the inner diameter of the casing 43 and having an inner diameter which is smaller than the lower end envelope portion 36b of the orifice constituting member 36. An upper surface of the seal ring 44 is contacted on the lower end of the outer envelope 34.

In addition, the plate spring 48C is a disc plate member having the outer diameter slightly shorter than the inner diameter of the casing 43.

The magnetic path member 46 made of a ferromagnetic (magnetizable) material such as iron is fixed onto the center lower part of the plate spring 48C coaxially to the mount axle P1. The gap retaining ring 50 is disposed with the peripheral edge portion of the plate spring 48C contacted on the lower surface of the seal ring 44.

The axial length of the gap retaining ring 50 is set to a total length of adding the axial length from the lower surface of the plate spring 48C up to the lower surface of the magnetic path member 46 to the elongated length of the clearance so that a predetermined clearance is installed between the lower surface of the magnetic path member 46 and the upper surface of the electromagnetic actuator 52.

In addition, the electromagnetic actuator 52 contacting the lower surface of the gap retaining ring 50 includes: the hollow cylindrical yoke 52a; the excitation coil 52b buried coaxially into the upper end surface of the yoke 52a; and the permanent magnet 52c having the magnetic pole surfaces faced vertically and fitted into the upper surface of the yoke 52a enclosed by the excitation coil 52b.

In details, the coil housing recess 52d continued as the annular recess is formed on the upper surface of the yoke 52a. The coil housing recess 52d, as shown in FIG. 6, has an inner corner 52d1 at its inner peripheral bottom surface rounded (reinforced) so as to have a surface of curvature of a radius R1.

Figure 8:
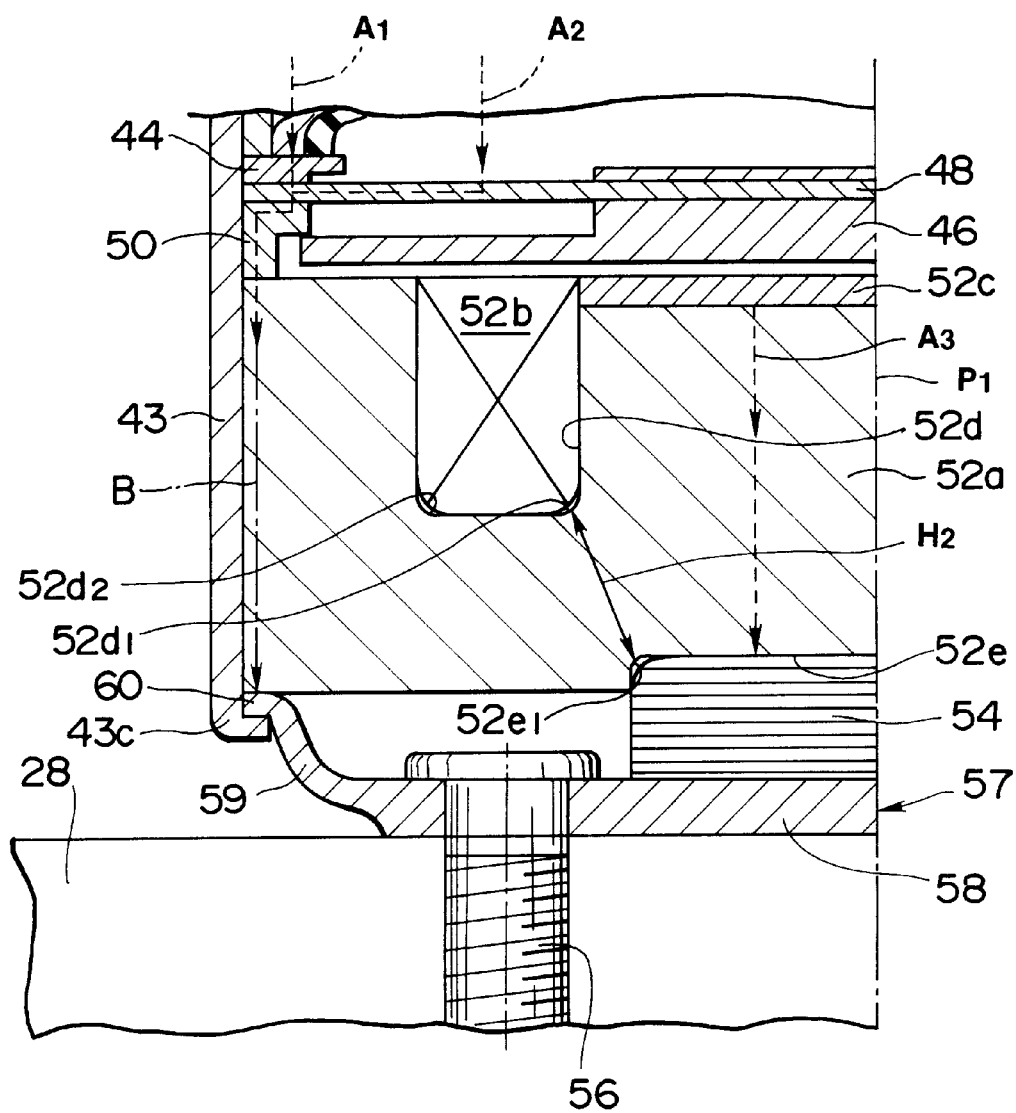
FIG. 8 is a third partially cross sectional view of the active vibration isolator in the fourth embodiment shown in FIG. 5 surrounding the coil housing recess, the excitation coil, the sensor housing recess, and a supporting base member.

It is also noted that, as shown in FIG. 8, the coil housing recess 52d has an outer corner 52d2 at its outer peripheral bottom surface rounded (reinforced) so as to have a surface of curvature of the radius R1.

Figure 6:
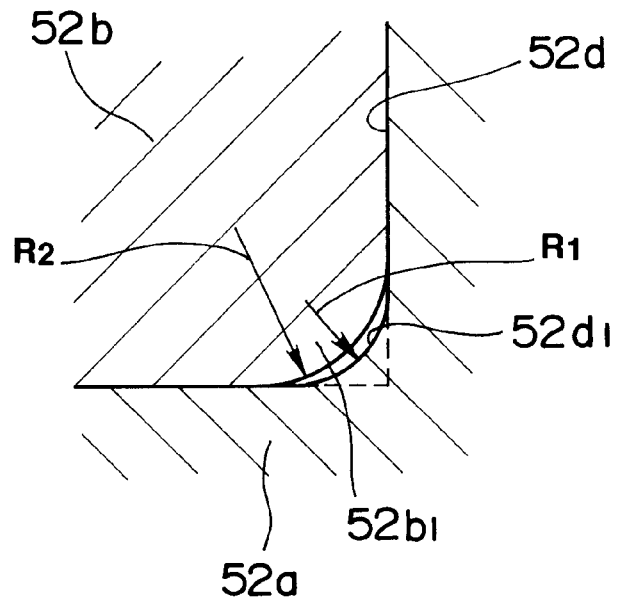
FIG. 6 is a first partially cross sectional view of the vibration isolator in the fourth embodiment shown in FIG. 5 surrounding a coil housing recess and an excitation coil of FIG. 5.

The excitation coil 52b buried into the coil housing recess 52d has a corner $52b_1$ opposing the inner corner 52d, which is rounded (reinforced) so as to have a surface of curvature of a radius $R_2$ larger than the radius R1 ($R_2 > R_1$), as shown in FIG. 6.

It is noted that the excitation coil 52b has a corner opposing the outer corner 52d2 at the outer peripheral bottom surface of the coil housing recess 52d which is rounded (reinforced) so as to have the surface of curvature of the radius $R_1(R_2 > R_1)$. The excitation coil 52b is buried into the coil housing recess 62d after the adhesive has been cast thereinto.

Figure 7:
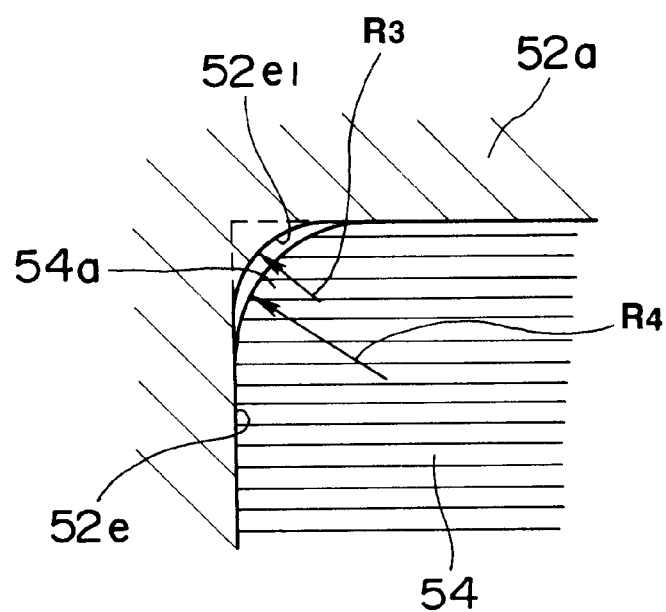
FIG. 7 is a second partially cross sectional view of the vibration isolator in the fourth embodiment shown in FIG. 5 surrounding a sensor housing recess and a load sensor of FIG. 5.

As shown in FIG. 5, a circular sensor housing recess 52e is formed at the center part of the lower surface of the yoke 52b. The sensor housing recess 52e has an upper corner 52e1 at the upper surface of the sensor housing recess 52e which is rounded (reinforced) so as to have the surface of curvature of the radius R3, as shown in FIG. 7. The load sensor 54 is disposed at a position below the lower surface of the yoke 52b with its upper part of the load sensor 54 receives within the sensor housing recess 52e.

It is noted that, as shown in FIG. 7, the corner 54a of the load sensor 54 opposing the upper corner 52e1 of the sensor housing recess 52e is rounded (reinforced) so as to have the surface of curvature of the radius $R_4$ ($R_4 > R_3$) which is larger than the radius $R_3$ of curvature of the upper corner 52e1 of the housing recess 52e.

The lid member 57 is disposed so as to enclose the load sensor 54 through a lower end of the load sensor 54.

The lid member 57, as shown in FIG. 5, includes: a bottom lid (lid member main body) 58 in an approximately disc shape; a diameter expanding envelope portion 59 extended from the outer peripheral edge portion of the bottom lid 58 toward the yoke 52a and whose diameter is increased as it goes to the yoke 52a; and an outer peripheral engagement portion 60 extended annually from the upper end peripheral edge of the diameter expanding envelope portion 59 toward the outside in the radial direction.

A plurality of holes 58a are formed on an outer peripheral side of the bottom lid 58 into which vehicle body side linkage bolts 56 are pressed under a pressure.

It is noted that the thickness of the diameter expanding envelope portion 59 formed between the bottom lid 58 and the outer peripheral engagement portion 60 is set to be thinner than that of the bottom lid 58 and the diameter expanding envelope portion 59 is formed of approximately bell shape bent toward the lower direction in which the supporting base member 35 shown in FIG. 1B is present with a predetermined radius of curvature.

In addition, the lower surface of the load sensor 54 is contacted on a center part of an upper surface of the lid member 57. When the outer peripheral engagement portion 60 is fixed to the lower end caulking portion 43c denoted by the solid line in FIG. 5 by means of the caulking, the bottom lid 58 passes the load sensor 54 toward the yoke 52a so that the lid member 57 is integrated to the casing 43 adding a predetermined pre-load to the lid member 57.

It is noted that the pre-load is a load to give previously an initial load to the load sensor 54.

The space defined by the cavity portion 32a of the supporting elastic body 32, the outer peripheral surface of the orifice constituting member 36, and the plate spring 48 serve as the main fluid chamber 66. The fluid such as the oil is sealed in a communication passage formed from the main fluid chamber 66 up to the space toward which the diaphragm 42 is extended via the opening 36d.

An inner space formed between the diaphragm 42 and the orifice constituting member 36 are formed as the sub fluid chamber 67. The communication passage between the sub fluid chamber 67 and the main fluid chamber 66 is an orifice 68. When the volume of the main fluid chamber 66 is varied, a fluid resonance occurs according to the sub fluid chamber 67 and the orifice 68.

It is noted that the characteristic of the fluid resonance system determined according to the fluid mass within the orifice 68 and according to the formation of the fluid path in the expansion direction of the supporting elastic body 32 is adjusted to provide the high dynamic spring constant and the high damping force when the engine shake occurs during the run of the vehicle, i.e., when the engine mount 1 receives the vibration having the frequency in a range from 5 Hz to 15 Hz.

The excitation coil 52b of the electromagnetic actuator 52 is connected to the controller 74 via the harness. As appreciated from FIGS. 1A and 1B, the excitation coil 52b develops the predetermined electromagnetic force according to the drive signal y as the drive current supplied from the controller 74.

The controller 74 includes: the microprocessor; the I/O interface; the A/D converter; the D/A converter; and the amplifier.

In a case where the vibration having the frequency band in which the fluid is movable between the main fluid chamber 66 and the sub fluid chamber 67 is inputted via the orifice 68, in other words, the vibration such as the idling vibration, the enclosed sound vibration whose frequency is higher than the engine shake is received, the controller vibration having the same period as that of the vibration is developed in the engine mount 1 and the drive signal y is developed and supplied to the excitation coil 52e so that the transmission force of the transmission to the member 28 indicates "0" (More specifically, the vibration force inputted to the engine mount 1 according to the vibration on the engine 22 is cancelled according to the control force derived by means of the electromagnetic force of the electromagnetic actuator 52).

It is noted that the idling vibration and the enclosed sound vibration are developed mainly due to the fact that the engine vibration having the second order component of the engine revolution (the engine 30 is the reciprocating four-cylinder engine in the same case of the first embodiment) is transmitted to the member 35 via the engine mount 1. Hence, if the drive signal y which is synchronized with the second-order component of the engine revolution, the reduction in the vibration transmissibility is possible.

In the fourth embodiment, the impulse signal synchronized with the revolution of the crankshaft of the engine 30 is developed and outputted by the pulse signal generator as the reference signal x. the reference signal being supplied to the controller 20 representing the developed condition of the vibration on the engine 30.

In addition, the load sensor 54 detects the vibration situation of the supporting base member 35 (base) in the form of the load and outputs the detected result in the form of the residual vibration signal e, the residual vibration signal e being supplied to the controller 20 and representing the signal after the vibration interference. The controller 20 develops and outputs the drive signal y in accordance with the Filtered-X LMS algorithm which is one of the sequentially updating adaptive algorithms.

Next, the operation on the anti-vibration (prevention of the vibration from being transmitted to the vehicle body) of the active engine mount 1 in the fourth embodiment will be described.

When the engine 22 is in the cranked state and the vibration is inputted to the engine mount 1, the controller 20 executes the predetermined processing of calculation so that the drive signal y is outputted to the electromagnetic actuator 52 and the active control force is developed which can reduce the vibration on the engine mount 1.

In details, the controller 20 sequentially supplies the filter coefficient of the adaptive digital filter W at the interval of the predetermined sampling clock from the time at which the reference signal x and the residual vibration signal e are inputted into the controller 20.

Consequently, the magnetic force is developed according to the drive signal y on the excitation coil 52b. Since the constant magnetic force is already given to the magnetic path member 46 by means of the permanent magnet 52c, the magnetic force by means of the excitation coil 52b may be considered to strengthen or weaken the magnetic force of the permanent magnet 52c. In details, with no drive signal y supplied to the excitation coil 52b, the magnetic path member 46 can be displaced at the neutral position at which the elastically supporting force by means of the plate spring 48 and the magnetic force generated is on the excitation coil 52b by means of the drive signal y are balanced.

When the drive signal y is supplied to the excitation coil 52b in the neutral state, the magnetic path member 46 is displaced in the direction such that its clearance formed against the electromagnetic actuator 52 is increased if the magnetic force generated on the excitation coil 52b is in the same direction as the magnetic force of the permanent magnet 52c. On the contrary, if the magnetic force generated on the excitation coil 52b is the same as that of the permanent magnet 52c, the magnetic path member 46 is displaced in the direction such that its clearance formed against the electromagnetic actuator 52 is decreased.

In this way, the plate spring 48 is displaceable in vertical direction according to the magnetic force developed by the electromagnetic actuator 52. If the plate spring 48C is displaced vertically, the volume of the main fluid chamber 46 is varied. Since the expansion spring of the supporting elastic body 32 according to its volume variation (supposing a physical model, both supporting spring and expansion spring are intervened in parallel to each other) is deformed, the active supporting force in the normal or reverse direction is developed on the engine mount 1. Each filter coefficient Wi of the adaptive digital filter W which serves as the drive signal y is sequentially updated in accordance with the synchronous type Filtered-X LMS algorithm.

After each filter coefficient Wi of the adaptive digital filter W is converged into the optimum value when some time has passed, the drive signal y is supplied to the engine mount 1. Hence, the idling vibration and the enclosed sound vibration are transmitted to the member 28 via the engine mount 1.

Suppose that the main transmission path of the vibration force is inputted from the engine 30 to the engine mount 1.

As shown in FIG. 8, the vibration is inputted from the engine 30 to the orifice constituting member 36 via the supporting spring of the supporting elastic body 32.

Thereafter, the transmission path can include: a first transmission path from the orifice constituting member 36 to the phase member 35 via the seal ring 44, the gap retaining ring 50, the electromagnetic actuator 52, and the lid member 57 (the path denoted by the broken arrow $A_1$ in FIG. 8); and a second transmission path (route denoted by an arrow $A_2$ of FIG. 8) from the engine 30 toward the fluid within the main fluid chamber 66 through the expansion spring of the supporting elastic body 32, and, thereafer, the base member 36 via the plate spring, the gap retaining ring 50, the electromagnetic actuator 52, and finally to the lid member 57; and a third transmission branched path ($A_3$ in FIG. 8) inputted from the axial center of the yoke 52a as the reaction force from the permanent magnet 52c providing the magnetic force for the magnetic path member 46 into the base member 35 via the load sensor 54 and the lid member 57.

Although the vibration force passing the first transmission path $A_1$ and the vibration force passing the second transmission path $A_2$ are overlapped on the upper peripheral side of the yoke 52a, the vibration force overlapped on the upper surface located at the outer periphery of the yoke 52a is branched into two: the route toward the load sensor 54; and the route inputted to the lid member 57 via the outer peripheral surface of the yoke 52a (the route denoted by a dot-and-dash line arrow mark B in FIG. 8).

When the vibration force from the outer peripheral side (direction denoted by the dot-and-dash line B) is acted upon the yoke 52a with the lower surface contacted against the load sensor 54 as a fulcrum, the force to deform the yoke 52a in an convex arc shape toward the upper direction is added so that the outer peripheral side of the yoke 52a is moved downward (toward the base member 28) from the boundary between the coil housing recess 52d which serves as the minimum thickness portion and the sensor housing recess 52e.

It is, however, noted that in the yoke 52a of the fourth embodiment, the corner 52d1 of the coil housing recess 52d and the corner 52e1 of the sensor housing recess 52e are rounded so that the size $H_2$ of the minimum thickness portion is relatively increased by forming the rounded corners 52d, and 52e, ($H_2 > H_1$ : $H_1$ denotes the size of the minimum thickness portion when the corners 52d1 and 52e1 are not rounded).

In this way, the yoke 52a whose size (length) $H_2$ of the minimum thickness portion between the coil housing recess 52d and the sensor housing recess 53e is increased has such a large rigidity as not easily deformed even if the vibration force described above is acted upon the yoke 52a.

Hence, almost all of the vibration forces on the first transmission path $A_1$ and on the second transmission path $A_2$, both of the paths $A_1$ and $A_2$ being overlapped on the outer peripheral portion of the upper surface of the yoke 52a, are inputted from the yoke 52a having the large rigidity into the load sensor 54. In details, since almost all of the vibrations transmitted from the engine 22 to the member 28 are inputted to the load sensor 54 via the yoke 52a, the residual vibration transmitted to the supporting base member 28 without being enabled to be canceled by means of the above-described active control force can accurately be detected.

This route includes: the outer peripheral engagement portion 60 of the lid member 57; the diameter expanding envelope portion 59; and the bottom lid 58 in the sequence beginning at the outer periphery of the lower surface of the yoke 52a.

The diameter expanding envelope portion 59 within the above-listed vibration transmission members is formed in a thin (wall) thickness form and in the approximately bell shape and is bent downward to have the predetermined radius of curvature so as to provide the member of the diameter expanding envelope portion 59 having the smaller rigidity easily deformable.

Hence, since the vibration transmitted from the yoke 52a toward the base member 35 (shown in FIG. 1B) via the lid member 57 is interrupted by the diameter expanding envelope portion 59 whose rigidity is reduced, all of the vibration (applying) forces are inputted to the load sensor 54 via the yoke 52a, the detection of the residual vibration by means of the load sensor 54 can more accurately be detected.

After the casting of the adhesive into the coil housing recess 52d, the excitation coil 52b is buried. However, since the adhesive is smoothly cast thereinto along the curved surface of the corners 52d1 and 52d2, the casting operation of the adhesive can easily be carried out.

In addition, since the corner 52b1 of the excitation coil 52b is formed with the larger roundness thereof than that of each rounded corner 52d1 and 52d2 of the coil housing recess 52d (the radius $R_2$ of curvature at the rounded corner 52b1 is larger than the radius of curvature $R_1$ at each rounded corner 52d1 and 52d2), the outer surface of the excitation coil 52b except the corners can be buried within the inner surface of the coil housing recess 52d with their surfaces closely contacted against each other.

Consequently, almost no air reservoir can occur within the coil housing portion 52d. In addition, a moisture developed along with a thermal expansion and/or shrinkage of air and a crack or fragmentation of the sealing part in the engine mount 1 occurring along with the thermal expansion and/or shrinkage can be prevented.

Furthermore, since, as shown in FIG. 7, the rounded corner 54a of the load sensor 54 is formed with its roundness of the rounded corner 54a being set to be larger than the roundness of the corner 52e1 of the sensor housing recess 52e (the radius of curvature of $R_4$ of the rounded corner 54a is larger than the radius of curvature R3 of the rounded corner 52e1 of the sensor housing recess 52e), the pressure receiving surface (upper surface) of the load sensor 54 can be brought in close contact with the lower surface of the sensor housing recess 52e without failure.

Thus, the load sensor 54 can normally be mounted on the lower surface of the yoke 52a, as compared with the corners of the load sensor and sensor housing recess formed mutually perpendicularly (without corner rounding).

Although, in the fourth embodiment, the coil housing corners 52d1 and 52d2 of the coil housing recess 52d are rounded (reinforced) so as to provide each predetermined radius of curvature, the concept in the fourth embodiment is without provision of the corners at right angles and the same action and advantages can be obtained in an alternative case wherein, for example, the coil housing corners 52d1 and 52d2 are chamfered to provide inclined surfaces.

In addition, the same action and advantages can be achieved in another alternative case wherein the corners 52b1 of the excitation coil 52b opposing the coil housing corners 52d1 and 52d2 are chamfered to provide the inclined surfaces.

The same action and advantages can be achieved in a still another alternative case wherein the corner 54a of the load sensor 54 opposing the corner 52e of the sensor housing recess 52 is chamfered to provide the inclined surface.

In the fourth embodiment, the diameter expanding envelope portion 59 of the lid member 54 is formed in the approximately bell shape such that the diameter expanding envelope portion 59 is bent downward. On the contrary, the same action and advantages can be achieved in the alternative case wherein the diameter expanding portion of the lid member is formed in the approximately bell shape such that the diameter expanding envelope portion 59 is bent downward.

The fourth embodiment exemplifies the active vibration isolator according to the present invention when applied to the vehicle as the active engine mount 1 of the engine 30. The active vibration isolator according to the present invention is also applicable to, for example, a vibration transmission preventing apparatus of a machine tool developing the vibration.

In each of the first, second, third, and fourth embodiments, the drive signal y is developed in accordance with the synchronous-type Filtered-X algorithm. However, the adaptive algorithm used in each of the first, second, third, and fourth embodiments may be, for example, the normal type Filtered-X LMS algorithm or a frequency range LMS algorithm. If the system's characteristic is stable, either the digital filter or an analog filter, each of which has fixed filter coefficients may be used to develop the drive signal y.

Furthermore, if the frequency of the inputted vibration is constant, the frequency of the drive signal y may be fixed to the frequency of the vibration and such a feedback control that only the phase of the drive signal y or the phase and amplitude of the drive signal y is gradually varied in the direction such that the level of the residual vibration signal e is reduced.

It is noted that a small hole 10AA or 52$aa$ shown in FIGS. 2, 3, 4, or 5 through which a lead wire from the excitation coil 10B or 52$b$ is drawn to be connected to the controller 20 shown in FIGS. 1A and 1B and another small hole 48$aa$ shown in FIG. 4 or the same small hole 10AA or 52$aa$ through which a lead wire from the load sensor 22 or 54 is drawn to be connected to the controller 20. These small holes have diameters which do not affect the rigidities of the yoke 10A and the lid member 48 or 57.

What is claimed is:

1. An apparatus for actively reducing a vibration comprising:
    a) a vibration source;
    b) a supporting base member on which the vibration source is supported;
    c) a vibration isolator including a controlled vibration source and interposed between the vibration source and the supporting base member, the controlled vibration source being adapted for developing a controlled vibration to be interfered against a vibration developed from the vibration source at an interference position of the vibration isolator, the vibration isolator further including: a predetermined rigidity member disposed on another position of the vibration isolator toward the supporting base member with respect to the interference position, the predetermined rigidity member being so arranged in the vibration isolator that all vibration forces transmitted from the vibration source toward the supporting base member are once concentrated thereonto; a lid member, fixed onto the supporting base member and having a peripheral edge portion thereof coupled to a surface of the predetermined rigidity member which faces toward the supporting base member so as to provide a gap between a more inner portion of the lid member than the peripheral edge portion thereof and the surface of the predetermined rigidity member; and a load sensor for detecting a residual vibration after the interference of the controlled vibration against the vibration developed from the vibration source and outputting the detected residual vibration in the form of a residual vibration signal, the load sensor having a pressure receiving surface thereof and which is so inserted between the predetermined rigidity member and the lid member so as to be located at an approximately center position of the gap and so as to receive the residual vibration from the predetermined rigidity member at its pressure receiving surface; and
    d) a controller for developing and outputting a drive signal to drive the controlled vibration source to develop the controlled vibration on the basis of the residual vibration signal from the load sensor.

2. An apparatus for actively reducing a vibration as claimed in claim 1, wherein the peripheral edge portion of the lid member is projected toward a direction at which the predetermined rigidity member is located so that the lid member is formed in an approximately letter-U shape in cross section and is caulked to the predetermined rigidity member with the projected peripheral edge portion of the lid member contacted on the surface of the predetermined rigidity member.

3. An apparatus for actively reducing a vibration as claimed in claim 2, wherein the controlled vibration source of the vibration isolator comprises: a supporting elastic body intervened between the vibration source and the supporting base member; a fluid chamber defined by the supporting elastic body and in which a fluid is sealed; a movable member for forming a part of partitioning wall of the fluid chamber and capable of displacing in a direction toward which a volume of the fluid chamber is varied; and an electromagnetic actuator interposed between the supporting elastic body and the supporting base member for developing a force to displace the movable member in the direction toward which the volume of the fluid chamber is varied in response to the drive signal from the and wherein the predetermined rigidity member is a yoke constituting the electromagnetic actuator.

4. An apparatus for actively reducing a vibration as claimed in claim 3, wherein the vibration isolator includes an approximately cylindrical casing for housing the electromagnetic actuator, the supporting elastic body being attached onto the casing and the casing being fixed to the yoke of the electromagnetic actuator so as to be brought in non-contact against the lid member and the supporting base member.

5. An apparatus for actively reducing a vibration as claimed in claim 4, wherein one inner end surface of the casing is fixed to an outer peripheral surface of the yoke of the electromagnetic actuator, an end portion of the yoke being exposed to an external of the casing, the peripheral edge portion of the lid member is fixed to an end surface of the yoke which is located at the end portion of the yoke, and the supporting elastic body is intervened between the other inner end surface of the casing and the vibration source.

6. An apparatus for actively reducing a vibration as claimed in claim 5, wherein the one inner end surface of the casing is fixed to the outer peripheral surface of the yoke of the electromagnetic actuator by means of a caulking.

7. An apparatus for actively reducing a vibration as claimed in claim 5, wherein the one inner end surface of the casing is fixed to the outer peripheral surface of the yoke of the electromagnetic actuator by means of a welding.

8. An apparatus for actively reducing a vibration as claimed in claim 6, wherein the movable member comprises: a plate spring having a peripheral edge portion supported on either of the vibration source or the supporting base member on which the electromagnetic actuator is attached; and a magnetic path member made of a magnetizable material and which is fixed onto an approximately center part of the plate spring which faces against a surface of the yoke.

9. An apparatus for actively reducing a vibration as claimed in claim 8, wherein the vibration isolator further includes an orifice and a volume variable sub fluid chamber which is communicated with the fluid chamber via the orifice and wherein the fluid is sealed into the fluid chamber, the orifice, and the sub fluid chamber.

10. An apparatus for actively reducing a vibration as claimed in claim 2, wherein the controlled vibration source of the vibration isolator comprises: a supporting elastic body intervened between the vibration source and the supporting base member; a fluid chamber defined by the supporting elastic body and in which a fluid is sealed; a movable member for forming a part of partitioning wall of the fluid chamber and capable of displacing in a direction toward which a volume of the fluid chamber is varied; and an electromagnetic actuator interposed between the supporting elastic body and the supporting base member for developing a force to displace the movable member in the direction toward which the volume of the fluid chamber is varied in response to the drive signal from the controller and wherein the predetermined rigidity member is an attachment member for supporting a part of the elastic body which is extended toward the supporting base member.

11. An apparatus for actively reducing a vibration as claimed in claim 3, wherein the vibration isolator includes: an approximately cylindrical casing intervened between the supporting elastic body and the supporting base member; an annular supporting member installed within the casing for supporting the movable member thereon so as to face the movable member toward the direction in which the supporting base member is coupled to the lid member with respect to the supporting elastic body, wherein the electromagnetic actuator is disposed within the casing so that the annular supporting member is contacted on an outer peripheral edge portion of one surface of the yoke which faces toward the supporting elastic body, the load sensor is disposed in the gap between an approximately center portion of the other surface of the yoke which faces toward the supporting base member and the opposing approximately center portion of the lid member, wherein the lid member has an outer peripheral engagement portion which is contacted against an outer peripheral edge of the other surface of the yoke which faces toward the supporting base member and which is caulked to an opening end of the casing, and wherein a rigidity of the yoke is enlarged and the rigidity of the lid member is lowered with respect to a vibration force of all of the vibration forces which is transmitted from the vibration force toward the supporting base member via an outer peripheral side surface of the yoke and the lid member so that all the vibration forces from the vibration source toward the supporting base member are once concentrated onto the yoke.

12. An apparatus for actively reducing a vibration as claimed in claim 11, wherein the yoke is formed in an approximately hollow cylindrical shape and wherein the electromagnetic actuator further comprises: a coil housing recess formed in an approximately circular ring shaped hollow portion of the yoke on the one surface of the yoke which faces toward the movable member; and excitation coil buried into the circular ring shaped hollow portion of the yoke; a permanent magnet fixed on a part of the other surface of the yoke which is enclosed by the excitation coil; and a sensor housing recess formed on the one surface of the yoke which faces toward the supporting base member in an approximately circular hole having a diameter smaller than an inner diameter of the coil housing recess, and wherein each of a corner of an inner side of the coil housing recess which is nearest to the sensor housing recess and of a corner of the sensor housing recess which is nearest to the coil housing recess is reinforced to enlarge the rigidity of the yoke.

13. An apparatus for actively reducing a vibration as claimed in claim 12, wherein each of the corner of an inner side of the coil housing recess which is nearest to the sensor housing recess and of the corner of the sensor housing recess which is nearest to the coil housing recess is rounded to enlarge the rigidity of the yoke.

14. An apparatus for actively reducing a vibration as claimed in claim 13, wherein a corner of the excitation coil buried into the coil housing recess is rounded so as to oppose to the rounded corner of the inner side of the coil housing recess.

15. An apparatus for actively reducing a vibration as claimed in claim 14, wherein a corner of the load sensor housed in the sensor housing recess is rounded so as to oppose the rounded corner of the sensor housing recess.

16. An apparatus for actively reducing a vibration as claimed in claim 15, wherein the lid member comprises a lid member main body on which the load sensor is contacted; the outer peripheral engagement portion; and a diameter expanding envelope portion whose diameter is increased to link the lid member main body to the outer peripheral engagement portion, a thickness of the diameter expanding envelope portion being thinned so as to lower the rigidity of the lid member.

17. An apparatus for actively reducing a vibration as claimed in claim 16, wherein the diameter expanding envelope portion of the lid member is bent toward the yoke or toward the supporting base member so as to form the lid member in an approximately bell shape.

18. An apparatus for actively reducing a vibration as claimed in claim 17, wherein a radius of curvature ($R_2$) of the rounded corner of the excitation coil is larger than the radius of curvature ($R_1$) of the rounded corner of the coil housing recess and the radius of curvature ($R_4$) of the rounded corner of the load sensor is larger than the radius of curvature ($R_3$) of the rounded corner of the sensor housing recess.

19. An apparatus for actively reducing a vibration applicable to an automotive vehicle, comprising:
  a) a vehicular engine;
  b) a supporting base member on which the vehicular engine is supported, the supporting base member being attached onto a vehicle body;
  c) an engine mount including a controlled vibration source and which is interposed between the vehicular engine and the supporting base member, the controlled vibration source being adapted for developing a controlled vibration to be interfered against a vibration developed from the vehicular engine at an interference position of the engine mount, the engine mount further including: a predetermined rigidity member disposed on another position of the engine mount toward the supporting base member with respect to the interference position, the predetermined rigidity member being so arranged in the engine mount that all vibration forces transmitted from the vehicular engine toward the supporting base member are once concentrated thereonto; a lid member, fixed onto the supporting base member and having a peripheral edge portion thereof coupled to a surface of the predetermined rigidity member which faces toward the supporting base member so as to provide a gap between a more inner portion of the lid member than the peripheral edge portion thereof and the surface of the predetermined rigidity member; and a load sensor for detecting a residual vibration after the interference of the controlled vibration against the vibration developed from the vehicular engine and outputting the detected residual vibration in the form of a residual vibration signal, the load sensor having a pressure receiving surface thereof and which is so inserted between the predetermined rigidity member and the lid member so as to be located at an approximately center position of the gap and so as to receive the residual vibration from the predetermined rigidity member at its pressure receiving surface; and d) a controller for developing and outputting a drive signal to drive the controlled vibration source to develop the controlled vibration on the basis of the residual vibration signal from the load sensor.

20. An apparatus for actively reducing a vibration comprising:

a) vibration developing means;

b) a supporting base member on which the vibration developing means is supported;

c) vibration isolating means including a controlled vibration developing means and interposed between the vibration developing means and the supporting base member, the controlled vibration developing means for developing a controlled vibration to be interfered against a vibration developed from the vibration developing means at an interference position of the vibration isolating means, the vibration isolating means further including: a predetermined rigidity member disposed on another position of the vibration isolating means toward the supporting base member with respect to the interference position, the predetermined rigidity member being so arranged in the vibration isolating means that all vibration forces transmitted from the vibration developing means toward the supporting base member are once concentrated thereonto; a lid member, fixed onto the supporting base member and having a peripheral edge portion thereof coupled to a surface of the predetermined rigidity member which faces toward the supporting base member so as to provide a gap between a more inner portion of the lid member than the peripheral edge portion thereof and the surface of the predetermined rigidity member; and residual vibration detecting means for detecting a residual vibration after the interference of the controlled vibration against the vibration developed from the vibration developing means and outputting the detected residual vibration in the form of a residual vibration signal, the residual vibration detecting means comprising a load sensor having a pressure receiving surface thereof and which is so inserted between the predetermined rigidity member and the lid member so as to be located at an approximately center position of the gap and so as to receive the residual vibration from the predetermined rigidity member at its pressure receiving surface; and d) controlling means for developing and outputting a drive signal to drive the controlled vibration developing means to develop the controlled vibration on the basis of the residual vibration signal from the load sensor.

* * * * *